No. 643,413. Patented Feb. 13, 1900.
R. KENNEDY.
ELECTROMAGNETIC VARIABLE SPEED AND CLUTCH GEARING.
(Application filed Feb. 20, 1899.)
(No Model.)
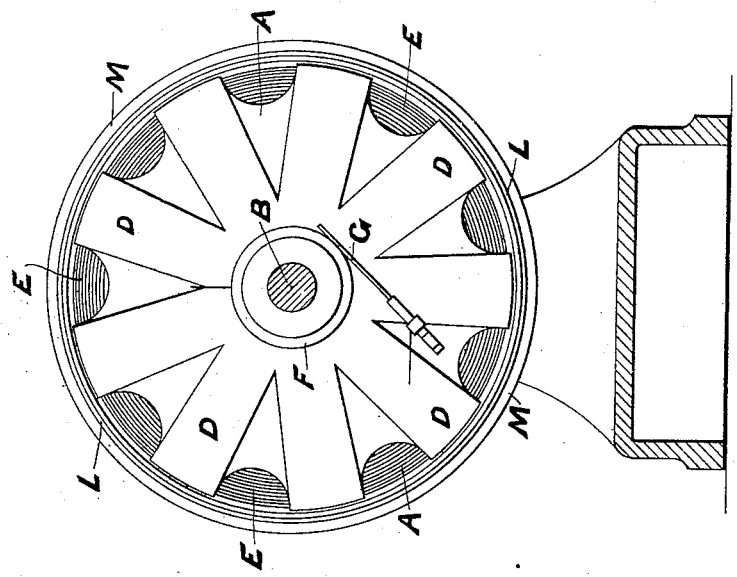
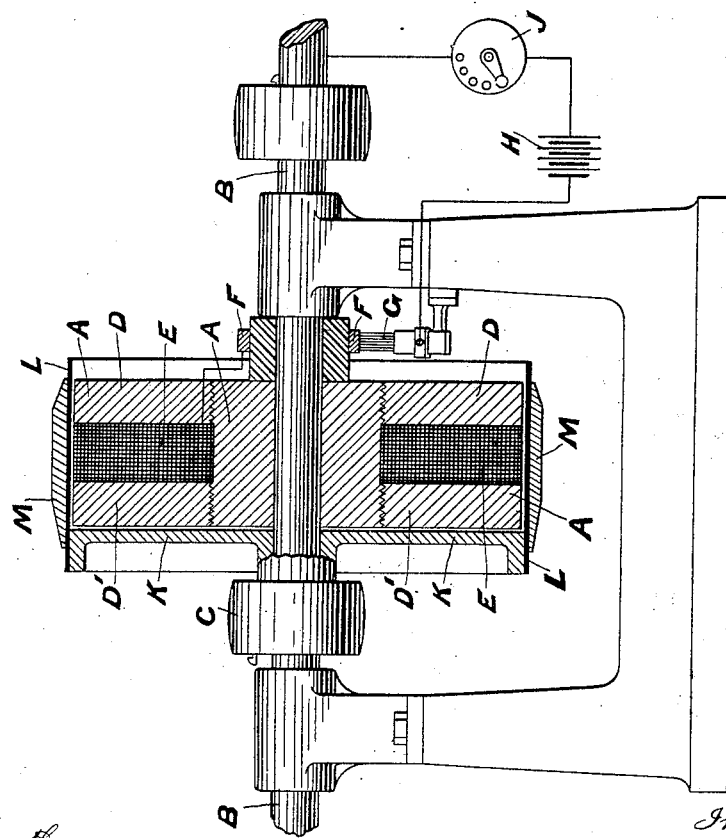

UNITED STATES PATENT OFFICE.

RANKIN KENNEDY, OF LEEDS, ENGLAND.

ELECTROMAGNETIC VARIABLE-SPEED AND CLUTCH GEARING.

SPECIFICATION forming part of Letters Patent No. 643,413, dated February 13, 1900.

Application filed February 20, 1899. Serial No. 706,115. (No model.)

*To all whom it may concern:*

Be it known that I, RANKIN KENNEDY, a subject of the Queen of Great Britain and Ireland, and a resident of Leeds, in the county of York, England, have invented certain new and useful Improvements in Electromagnetic Variable-Speed and Clutch Gearing, (for which an application for patent has been filed in Great Britain, No. 21,524, dated October 13, 1898,) of which the following is a specification.

These improvements relate to electromagnetic-clutch gearing; and my object is to enable power to be transmitted gradually and without jar from a continuously-rotating shaft to another shaft or pulley, the speed of transmission being varied as desired by varying the force of hold exerted by the clutch.

In order that my invention may be clearly understood, I will proceed to describe the same with reference to the accompanying drawings, in which similar letters refer to like parts in both figures.

Figure 1 is a longitudinal section of a clutch constructed according to my invention, and Fig. 2 is an end view of the same.

In the drawings I have shown the major portion of the clutch—viz., the field-magnet A—mounted on a continuously-rotating shaft B, and motion is to be transmitted to a pulley C, mounted loosely on the shaft B. The field-magnet A is made up of pole-pieces D D' and a field-magnet coil E, and the latter is connected to an insulated ring F, which receives an electric current from a brush G and generator H, the other end of the coil E being connected to the shaft B and thus back to the generator H by way of a rheostat J. The pole-pieces D are all of one polarity, such as "south," and the pole-pieces D' are all of the opposite polarity, such as "north." The pulley C carries a disk K, and on the periphery of the said disk an armature is carried which is composed of a copper or other suitable hoop L and a soft-iron or other ring M.

When no electric current is let into the field-magnet A, the pulley C stands at rest; but on passing an electric current through the coil E electric currents are induced in the armature-circuit, and these currents interlock with the field-magnet A, so as to produce a torque or holding force tending to prevent the exterior of the field-magnet A from traveling at a higher speed than that of the interior of the armature L, and the pulley C is thus driven at a certain speed less than that of the field-magnet A, the difference being dependent upon the strength of the field-magnet A and the load on the pulley C.

The speed of the field-magnet A must always differ from the speed of the armature L, as the currents induced in the latter depend upon the difference of speed between the armature L and the field-magnet A. The strength of the field-magnet A may, however, be varied as desired by varying the strength of the exciting-current by means of the rheostat J, thus enabling the strength of the torque to be varied at will to suit the load, which can thus be started gradually and without shock.

The above-described apparatus enables the greatest amount of torque to be obtained with the smallest difference of speed between the armature and the field-magnet, and also allows the strength of the clutch to be varied at will, thus making the said clutch most suitable for transmitting mechanical power.

Having now described my invention, what I claim as new, and desire to secure by Letters Patent, is—

In an electromagnetic clutch the combination with the driving-shaft and a multipolar field-magnet secured to the same, said field-magnet having but one coil only and filling the space between the pole-pieces, said pole-pieces being all of one polarity at one side of said coil and all of opposite polarity on the other side of said coil, of a second shaft and a ring-armature of copper and iron and a support for connecting said armature to said shaft, said armature closely surrounding the ends of the poles of the field-magnet, substantially as and for the purposes set forth.

In witness whereof I have hereunto set my hand in the presence of two witnesses.

RANKIN KENNEDY.

Witnesses:
GRIFFITH BREWER,
JOHN JOWETT.